United States Patent Office 3,770,834
Patented Nov. 6, 1973

3,770,834
NITROSATION OF PHENOLS WITH
NITROGEN TRIOXIDE
Thomas J. Prosser, Wilmington, Del., assignor to Hercules
Incorporated, Wilmington, Del.
No Drawing. Continuation-in-part of application Ser. No.
639,283, May 18, 1967, now Patent No. 3,510,527. This
application Apr. 2, 1970, Ser. No. 25,301
Int. Cl. C07c 39/02, 79/22
U.S. Cl. 260—621 N                14 Claims

ABSTRACT OF THE DISCLOSURE

Disclosed is a process for nitrosating nitrosatable phenolic material. Nitrogen trioxide and the phenolic material are introduced simultaneously at specific rates into an agitated, acidic, aqueous medium established and maintained in the temperature range from about −20 to about 20° C., and having an initial concentration of nitrous acid in a range from about 0 to about 1% by weight of the aqueous medium. The initial pH of the aqueous medium is less than about 5, preferably about 1, and comprises water and, dissolved in the water, acid material selected from the group consisting of water-soluble strong acids like nitric acid and sulfuric acid. The rate of introduction of the phenolic material into the aqueous medium is preferably substantially the rate at which the phenolic material is nitrosated in the aqueous medium. The rate of introduction of nitrogen trioxide into the aqueous medium is substantially at the rate at which a slight stoichiometric excess, relative to the phenolic material being introduced into the aqueous medium, of nitrous acid is established and maintained in the reaction medium. As reaction takes place nitrosated phenolic product forms and precipitates. Preferably the reaction mixture that results is maintained with agitation in the temperature range until the reaction is substantially complete, and then the precipitated nitrosated phenolic product is separated from the reaction mixture.

---

The application is a continuation-in-part of the application, Ser. No. 639,283, filed May 18, 1967 and now Pat. No. 3,510,527, for Preparation of p-Nitrophenols.

This invention is in the chemical arts. It relates to that branch of organic chemistry having to do with the synthesis of nitrosophenols.

Nitrosophenols are useful compounds. For instance, p-nitrosophenol which has the structural formula:

can be oxidized to form p-nitrophenol which is a valuable chemical intermediate for other chemical compounds useful as insecticides, pharmaceuticals, dyestuffs and antioxidants. p-Nitrosophenol is particularly useful as an intermediate in the synthesis of p-aminophenol and phenylene diamines which have a variety of commercial uses.

This invention provides a process for making nitrosophenols.

In summary, the process of this invention comprises introducing nitrogen trioxide ($N_2O_3$) and nitrosatable phenolic material simultaneously at specific rates into an agitated, acidic, aqueous medium established and maintained in the temperature range from about −20 to about 20° C.

The aqueous medium consists essentially of water and acid material in solution in the water at a concentration sufficient to make the initial pH of the aqueous medium below about 5. The initial nitrous acid concentration of the aqueous medium is in the range from about 0 to about 1% by weight of the aqueous medium.

The acid material consists essentially of at least one strong acid. In some embodiments of the process of this invention it comprises only one strong acid. In other embodiments it comprises two or more such acids. While the acid material initially can comprise nitrous acid, and in those embodiments in which the aqueous medium is recycled the acid material initially usually does comprise nitrous acid, it is a fundamental concept of this invention that the nitrous acid concentration of the aqueous medium at least initially and preferably during introduction of the phenolic material and nitrogen trioxide into the aqueous medium not exceed about 1% by weight of the aqueous medium. One reason is that a nitrous acid concentration substantially in excess of about 1% by weight of the aqueous medium during the introduction of the phenolic material into the aqueous medium results in less nitrosation and more nitration of the phenolic material and in greater production of nitric oxide (NO). Subject to this limitation, therefore, examples of a strong acid include both inorganic and organic acids such as sulfuric acid, nitric acid, hydrochloric acid, phosphoric acid, alkylsulfonic acids such as methylsulfonic acid and the like, aromatic sulfonic acids such as benzenesulfonic acid, toluenesulfonic acid, and the like, sulfamic acid, and the like. In preferred embodiments of this invention, only inorganic or mineral acids are employed with sulfuric acid being especially preferred.

While the aqueous medium can be formed from water and one or more acids, such also can be formed from water and one or more acid salts that dissociate in water to form one or more acids, for example, sodium bisulfide and the like. Of course, both one or more acids and one or more acid salts can be admixed with water to form the aqueous medium.

The concentration of the acid material in the aqueous medium depends on the dissociation constant or constants of the acid or acids present, and the desired initial pH of the aqueous medium. In general the desired initial pH is less than about 5. Usually it is within the range from about 0.1 to about 4 with about 1 being recommended.

The nitrosatable phenolic material consists essentially of a nitrosatable phenol. In some embodiments of the process of this invention it comprises only one such phenol. In other embodiments of this invention it comprises two or more such phenols. Examples of nitrosatable phenols comprise phenol, m-, o- and p-cresols, other o-, m- and p-alkylphenols such as o-, m- and p-ethyl, propyl, isopropyl-, n-butyl, sec. butyl-, t-butyl-, n-decyl-, n-octadecyl-, and the like, phenols, o-, m- and p-cycloalkylphenols such as o-, m- and p-cyclobutyl-, cyclobutyl-, cyclopentyl-, cyclohexyl-, cycloheptyl-, cyclooctyl-, and the like, phenols, 2,6- and 2,4-dialkylphenols such as 2,6-dimethylphenol, 2-methyl-4-ethylphenol, 2,6-didecylphenol, 2,4-didodecylphenol, 2,6-dioctadecylphenol, and the like, 2,6- and 2,4-dicycloalkylphenols, o-, m- and p-halophenols such as o-, m- and p-chloro-, fluoro-, bromo-, and iodophenols, 2,4-, 3,4-, and 2,5-dihalophenols, 2,4,5-trihalophenol, o-, m- and p-phenylphenols, and the like, alpha-naphthol, beta-naphthol, and the liike.

While the nitrosatable phenolic material can be introduced as such into the aqueous medium, particularly in those instances in which it is in the liquid state when so introduced, in some embodiments it is introduced into the aqueous medium in solution in water or in a water-miscible, preferably inert solvent such as, for example, acetone or the like.

The nitrogen trioxide is preferably in the liquid state when introduced into the aqueous medium. However, under the broader concepts of this invention it can be in the vapor state when introduced into the aqueous medium.

The rate of introduction of the phenolic material into the aqueous medium is in the range characterized at one end by a rate substantially less than the rate at which the phenolic material reacts in the aqueous medium and below which the rates are impractical, and at the other end by the rate at which a substantial accumulation of unreacted phenolic material begins to appear in the aqueous medium. In the case of phenol this is evidenced by the formation of tar. Preferably the rate of introduction is at about the rate at which the phenolic material reacts in the aqueous medium. In general, in the batch embodiment of the process of this invention, satisfactory results are obtained at rates of introduction in a range from about 0.002 to about 0.02 mole of phenolic material per minute per liter of aqueous medium.

The rate of introduction of nitrogen trioxide into the aqueous medium is substantially such that the concentration of nitrous acid in the aqueous medium during the introduction of the phenolic material into the aqueous medium is established and maintained in slight stoichiometric excess relative to the unreacted phenolic material in the aqueous medium. This condition is obtained when the nitrous acid concentration during the introduction of the phenolic material into the aqueous medium is established and maintained at a value greater than 0% by weight of the aqueous medium, up to about 5% by weight of the aqueous medium, and preferably at about 0.5% by weight of the aqueous medium. In this connection, when nitrogen trioxide is introduced into the acidic aqueous medium, nitrous acid is formed. The reaction that takes place generally is believed to be according to the equation:

$$N_2O_3 + H_2O \rightleftharpoons 2HNO_2$$

The nitrous acid reacts with the phenolic material to form nitrosated phenolic product, the desired reaction in the case of phenol being depicted by the equation:

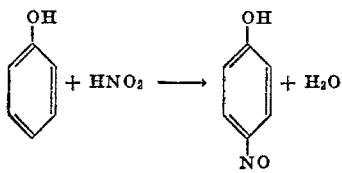

In the batch embodiment of the process of this invention satisfactory results are obtained at rates of introduction of nitrogen trioxide into the aqueous medium in the range from about 0.001 to about 0.01 mole per minute per liter of aqueous medium with the rate of introduction of nitrogen trioxide being in the desired slight stoichiometric excess relative to the rate of introduction of the phenolic material into the aqueous medium.

In carrying out the batch embodiment of the process of this invention, after introduction of the phenolic material into the aqueous medium has been completed, the introduction of nitrogen trioxide into the aqueous medium is preferably continued until the total quantity of nitrogen trioxide introduced into the aqueous medium is about 30–50% by weight in excess of the quantity theoretically required to obtain nitrosation to the desired extent of all the phenolic material. In this connection the over-all nitrosation reaction in the case of phenol is represented by the following equation:

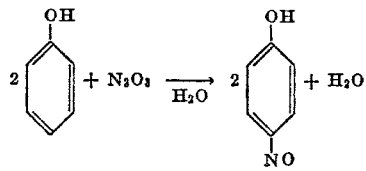

The volumetric ratio of aqueous medium to phenolic material in the process of this invention can vary widely. However, it should be enough to dissolve the nitrogen trioxide, and result in a stirrable slurry during the reaction and upon completion of the reaction. In general, satisfactory results are obtained in the practice of the batch embodiment of the process of this invention when the ratio of the volume of aqueous medium to the total volume of phenolic material introduced into the aqueous medium is in the range from about 750:1 to about 2000:1.

The temperature at which the reaction of this invention is carried out can vary widely. However, for best results the aqueous medium and resulting reaction mixture are established and maintained generally in the temperature range from about −20 to about 20° C., preferably in the temperature range from about −10 to about 10° C., and most desirably at about 0–2° C.

The reaction of this invention can be performed under atmospheric pressure. However, in preferred embodiments of this invention, the reaction is carried out under superatmospheric pressure to minimize vaporization of nitrogen trioxide from the aqueous medium and resulting reaction mixture. In these embodiments the pressure range is preferably from about 10 to about 70 millimeters of mercury. Preferably, in the batch embodiment of the process of this invention the aqueous medium and resulting reaction mixture are established and maintained under an inert gas blanket. Especially preferred is nitric oxide (NO), because its presence under pressure tends to retard decomposition of the nitrogen trioxide in the aqueous medium.

Following the introduction of the phenolic material and nitrogen trioxide into the aqueous medium, the resulting reaction mixture preferably is maintained with agitation in the reaction temperature range for a period of time in the range from about 20 minutes to about 2 hours. However, a "hold" time less than or greater than this range of time is within the broader aspects of this invention.

Upon introduction of the phenolic material and nitrogen trioxide into the agitated aqueous medium, nitrosation of the phenolic material occurs. As nitrosated phenolic product is formed, it precipitates. Preferably, after completion of the reaction, the precipitated nitrosated phenolic product is separated from the reaction mixture. In one embodiment this is done by filtration with preferably cold water washing. In this embodiment the approximately 10% by weight nitrosated phenolic product slurry filters and washes rapidly, leaving in the case of p-nitrosophenol a light tan to brown product assaying 95–100% p-nitrosophenol and comprising compact agglomerates 50–500 microns in diameter.

The process of this invention is carried out in conventional equipment. In the batch embodiment of the process the reaction is preferably carried out in a pressure tight reactor fitted with agitation means effective in structure and operation to achieve intimate mixing of the phenolic material and nitrogen trioxide in the aqueous medium, and to maintain good agitation of the resulting reaction mixture.

In one general embodiment of the process of this invention, the reaction is carried out on a batch basis. When nitrosated phenolic product is separated from the reaction mixture, the mother liquor in one practice of this embodiment is used in a succeeding run as part or all of the aqueous medium. In another general embodiment of the process of this invention, the admixing step, the hold step when practiced, and the product separation step, when practiced, are carried out on a continuous basis, and the mother liquor, when the separation step is practiced, is returned to the feed or front end of the reaction equipment used to carry out the process on a continuous basis. The recycled mother liquor comprises at least part, if not all, of the aqueous medium introduced into the feed end of the reaction equipment.

The best mode now contemplated of carrying out the invention is illustrated by the following working example of a specific embodiment of the process. This invention is not limited to this embodiment. In the example, unless otherwise expressly indicated, all percentages are by weight, all parts are expressed as "w.," all parts by volumes are expressed as "v.," and w. bears the same relationship to v. as the kilogram to the liter.

EXAMPLE

This example illustrates the nitrosation of phenol according to a batch embodiment of the process of this invention.

In this embodiment the reactor is a closed system, pressure tight reactor equipped with a mechanical stirrer, cooling coil, two pressure-equalized feed lines, one of which is jacketed and cooled to about −10° C. for the nitrogen trioxide, a gas delivery inlet and an off-gas outlet.

The reactor is charged with 0.75 molar aqueous solution (1000 v.) of sulfuric acid as the aqueous medium. With the stirrer in operation, the aqueous medium is cooled to 1° C. The gas space in the reactor above the aqueous medium is purged with nitrogen and then with nitric oxide, following which it is filled with nitric oxide and established and maintained at 59 millimeters of mercury pressure. With the stirrer in operation a 10 molar aqueous solution of phenol (solution flow rate=1 v. per minute) and liquid nitrogen trioxide (flow rate=0.32 v. per minute) are passed through the feed lines into the reactor. During the introduction of phenol and nitrogen trioxide into the reactor, the contents of the reactor are maintained at about 0–3° C. At the end of 100 minutes, the introduction of the aqueous solution of phenol into the reactor is stopped, and at the end of 120 minutes the introduction of liquid nitrogen trioxide into the reactor is stopped. However, the stirrer is continued in operation for about 90 minutes while the temperature of the reaction mixture is maintained at 0–3° C.

The reaction mixture is removed from the reactor and filtered. The filter cake is washed with 5° C. water (about 1000 v.) and then dried in vacuo at 48° C.

The product (92.8 w.) thus obtained consists essentially of p-nitrosophenol. A typical concentration of this compound in the product as indicated by UV spectroscopy is 98%.

The combined (2060 v.) filtrate and wash water comprises the following compounds at the indicated typical mole concentrations as ascertained by UV spectroscopic analysis:

| Compound: | Mole per liter |
|---|---|
| Phenol | 0.026 |
| p-Nitrosophenol | 0.032 |
| p-Nitrophenol | 0.002 |
| o-Nitrophenol | 0.003 |
| Other organics | 0.026 |
| Nitrous acid | 0.050 |

Thus, this invention provides a process for nitrosating phenolic compounds.

A feature of advantage of the process of this invention, particularly in the preferred embodiments thereof, is the minimal formation of nitric acid and nitro compounds.

Still another feature of advantage of the process of this invention is the efficiency of the nitrosation reagent, nitrogen trioxide. In another process nitrogen tetroxide is used. Compared to that process, the process of this invention is more efficient because less nitrosating reagent is employed.

Still another feature of advantage of the process of this invention, particularly of preferred embodiments of the process, is the high conversion of phenolic material.

These and other features, advantages and specific embodiments of this invention will become readily apparent to those exercising ordinary skill in the art after reading the foregoing disclosures. These other specific embodiments are within the scope of this invention unless otherwise expressly indicated to the contrary herein. Moreover, while a specific embodiment of this invention has been described in considerable detail, variations and modifications of this embodiment can be made without departing from the spirit and scope of the invention as disclosed and as claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. A process for nitrosating nitrosatable phenolic material, which comprises introducing said phenolic material and nitrogen trioxide simultaneously at specific rates into an agitated aqueous medium established and maintained in the temperature range from about −20 to about 20° C. under superatmospheric pressure with the pH of the aqueous medium being initially less than about 5, the initial concentration of nitrous acid in the aqueous medium being in a range from about 0 to about 1% by weight of the aqueous medium, the rate of introduction of phenolic material into the aqueous medium being in the range characterized at one end by a rate substantially less than the rate at which the phenolic material reacts in the aqueous medium, and at the other end by a rate at which a substantial accumulation of unreacted phenolic material begins to appear in the aqueous medium, and the rate of introduction of the nitrogen trioxide into the aqueous medium being such that the concentration of nitrous acid in the aqueous medium is established and maintained during the introduction of said phenolic material into said aqueous medium at a value greater than 0% by weight of the aqueous medium up to about 1% by weight of the aqueous medium, whereby a reaction mixture comprising nitrosated phenolic product is formed.

2. A process according to claim 1, in which the ratio of the volume of said aqueous medium to the total volume of said phenolic material introduced into said aqueous medium is in the range from about 750:1 to about 2000:1.

3. A process according to claim 1, in which the pH of the aqueous medium initially is in the range from about 0.1 to about 4.

4. A process according to claim 3, in which the pH initially is about 1.

5. A process according to claim 1, in which the rate of introduction of phenolic material into said aqueous medium is in the range from about 0.002 to about 0.02 mole of phenolic material per minute per liter of said aqueous medium.

6. A process according to claim 5, in which the rate of introduction of nitrogen trioxide into said aqueous medium is in the range from about 0.001 to about 0.01 mole per minute per liter of said aqueous medium.

7. A process according to claim 6, wherein the aqueous medium is established and maintained under nitric oxide at a pressure in the range from about 10 to about 70 millimeters of mercury.

8. A process according to claim 1, which is carried out on a batch basis.

9. A process according to claim 8, in which upon completion of the introduction of phenolic material into said aqueous medium, the introduction of said nitrogen trioxide is continued until the the total quantity of nitrogen trioxide introduced into the aqueous medium is 30–50% by weight in excess of the quantity theoretically required to obtain the desired nitrosation of the phenolic material.

10. A process according to claim 9, in which after completion of the introduction of said nitrogen trioxide into said aqueous medium, the resulting reaction mixture is maintained in said temperature range for a period of time in the range of about twenty minutes to two hours.

11. A process according to claim 1, in which nitrosated phenolic product is separated from the reaction mixture.

12. A process according to claim 11, in which at least part of the mother liquor portion of the reaction mixture after separation of nitrosated phenolic product therefrom is recycled.

13. A process according to claim 1, in which said aqueous medium consists essentially of sulfuric acid.

14. A process according to claim 13, in which said phenolic material consists essentially of phenol.

References Cited

UNITED STATES PATENTS

| 3,285,972 | 11/1966 | Young | 260—621 N |
|---|---|---|---|
| 3,714,267 | 1/1973 | Baldwin et al. | 260—621 N |
| 3,320,324 | 5/1967 | Kouba | 260—621 N |
| 3,510,527 | 5/1970 | Prosser | 260—621 N |
| 3,519,693 | 7/1970 | Harvey et al. | 260—622 |

OTHER REFERENCES

Veibel: "Berichte," (1930) pp. 1577–82, vol. 63.
Bunten et al.: "Chem. Soc. J." (1950), 2628–2631.
Arnall: "Chem. Soc. J." vol. 123, 3111–3115 (1923).
Vaughn et al.: "J. Organic Chem.," vol. 211 (1956), 1–3 and 5–10.

BERNARD HELFIN, Primary Examiner

W. B. LONE, Assistant Examiner

U.S. Cl. X.R.

260—622, 624 R, 619 R, 623 R

PO-1050
(5/69)

UNITED STATES PATENT OFFICE
CERTIFICATE OF CORRECTION

Patent No. 3,770,834  Dated November 6, 1973

Inventor(s) Thomas J. Prosser

It is certified that error appears in the above-identified patent and that said Letters Patent are hereby corrected as shown below:

In Column 2 at lines 56 and 57, " p-cyclobutyl-, cyclobutyl-, cyclopentyl " should appear as -- p-cyclopentyl-, --.

Signed and sealed this 2nd day of April 1974.

(SEAL)
Attest:

EDWARD M. FLETCHER, JR.
Attesting Officer

C. MARSHALL DANN
Commissioner of Patents